US012713487B2

(12) United States Patent
Kimba Dit Adamou et al.

(10) Patent No.: US 12,713,487 B2
(45) Date of Patent: Aug. 18, 2026

(54) METHOD AND APPARATUS FOR PROCESSING RADIO LINK FAILURE, DEVICE, AND READABLE STORAGE MEDIUM

(71) Applicant: VIVO MOBILE COMMUNICATION CO., LTD., Guangdong (CN)

(72) Inventors: Boubacar Kimba Dit Adamou, Guangdong (CN); Xiaodong Yang, Guangdong (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 350 days.

(21) Appl. No.: 18/497,472

(22) Filed: Oct. 30, 2023

(65) Prior Publication Data

US 2024/0064844 A1 Feb. 22, 2024

Related U.S. Application Data

(63) Continuation of application No. PCT/CN2022/089389, filed on Apr. 26, 2022.

(30) Foreign Application Priority Data

Apr. 30, 2021 (CN) ......................... 202110482566.2

(51) Int. Cl.
*H04W 76/19* (2018.01)
*H04W 36/30* (2009.01)

(52) U.S. Cl.
CPC .......... *H04W 76/19* (2018.02); *H04W 36/30* (2013.01)

(58) Field of Classification Search
CPC ..... H04W 76/19; H04W 36/30; H04W 76/36; H04W 76/30; H04W 4/40; H04W 76/11; H04W 88/08; H04L 1/08
See application file for complete search history.

(56) References Cited

U.S. PATENT DOCUMENTS

2020/0029384 A1 1/2020 Hong et al.
2022/0030493 A1* 1/2022 Hong .................... H04L 1/1896
2022/0117032 A1* 4/2022 Han .......................... H04L 1/08
2022/0286881 A1* 9/2022 Orsino .................. H04W 76/15

FOREIGN PATENT DOCUMENTS

CN 103975614 A 8/2014
CN 104469827 A 3/2015
WO 2021037582 A1 3/2021

OTHER PUBLICATIONS

WO_2020147046_A1 (Year: 2020).*
WO_2021037582_A1 (Year: 2021).*
International Search Report and Written Opinion for Application No. PCT /CN2022/089389, dated Jul. 28, 2022, 8 Pages.
LG Electronics Inc. "PC5 link failure handling for NR sidelink relay" 3GPP TSG-RAN WG2 Meeting #112e, Online Meeting, Nov. 2020, R2-2010652, 3 Pages.

* cited by examiner

*Primary Examiner* — Rushil P. Sampat
(74) *Attorney, Agent, or Firm* — Foley & Lardner LLP

(57) ABSTRACT

A method and an apparatus for processing a radio link failure, a device, and a readable storage medium. The method includes: sending, by a first device, first information to a network-side device, where the first information indicates that an RLF occurs to one or more second devices. The first device and the one or more second devices jointly transmit a first service.

17 Claims, 10 Drawing Sheets

201

A first device sends first information to a network-side device, where the first information indicates that an RLF occurs to one or more second devices

301

A second device sends second information to a first device, where the second information indicates that the first device should report occurrence of an RLF to one or more second devices to a network-side device

Figure 4:
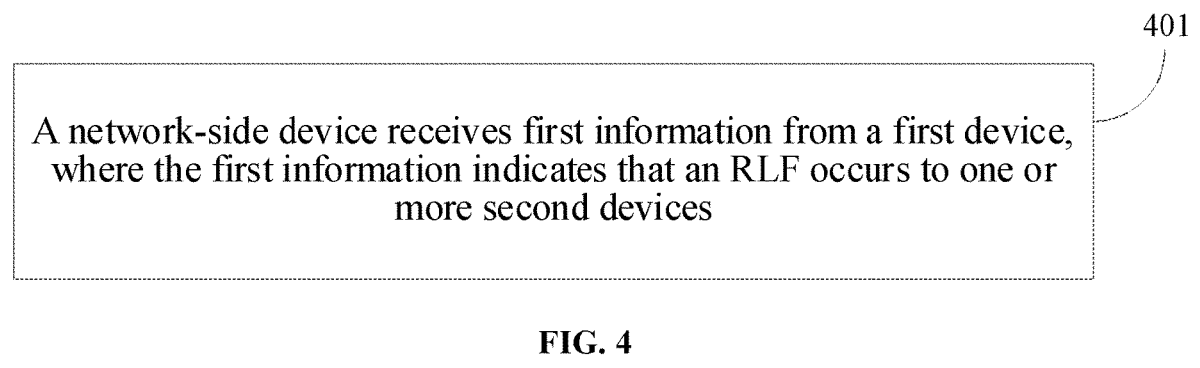

401

A network-side device receives first information from a first device, where the first information indicates that an RLF occurs to one or more second devices

First sending module 1001

METHOD AND APPARATUS FOR PROCESSING RADIO LINK FAILURE, DEVICE, AND READABLE STORAGE MEDIUM

CROSS-REFERENCE TO RELATED APPLICATIONS

This application is a continuation of PCT International Application No. PCT/CN2022/089389 filed on Apr. 26, 2022, which claims the priority of Chinese Patent Application No. 202110482566.2 filed on Apr. 30, 2021, which are incorporated herein by reference in their entireties.

TECHNICAL FIELD

This application relates to the field of communication technologies, and in particular, to a method and an apparatus for processing a radio link failure, a device, and a readable storage medium.

BACKGROUND

In prior art, a terminal (for example, a user equipment (UE)) establishes a control plane connection and a user plane connection to a core network, for example, a protocol data unit (PDU) session. When the UE moves between different cells, different base stations, or even different core network nodes, a network side transmits the control plane connection, the user plane connection, and a transmission status of the UE between the different network nodes, to ensure that service transmission of the UE can be constant without interruption, and can satisfy a lossless requirement.

When two UEs (for example, a UE 1 and a UE 2) are about to transmit data, the two UEs independently establish a core network/access network control plane connection and a user plane connection, for example, a non-access stratum (NAS) connection (a core network control plane), a radio resource control (RRC) connection (an access network control plane), a PDU session (a core network user plane), and a data radio bearer (DRB)/quality of service (QoS) flow (an access network user plane).

For example, in a case that the UE 1 and the UE 2 constantly transmit a common service, if a radio link failure (RLF) occurs to the UE 1 and/or the UE 2, how to report the RLF is a problem urgently to be resolved.

SUMMARY

In a first aspect, a method for processing an RLF is provided, including: sending, by a first device, first information to a network-side device, where the first information indicates that an RLF occurs to one or more second devices; and the first device and the one or more second devices jointly transmit a first service.

In a second aspect, a method for processing a radio link failure is provided, including: sending, by a second device, second information to a first device, where the second information indicates that the first device should report occurrence of an RLF to one or more second devices to a network-side device; and the first device and the one or more second devices jointly transmit a first service.

In a third aspect, a method for processing a radio link failure is provided, including: receiving, by a network-side device, first information from a first device, where the first information indicates that an RLF occurs to one or more second devices; and the first device and the one or more second devices jointly transmit a first service.

In a fourth aspect, an apparatus for processing an RLF is provided, including: a first sending module, configured to send first information to a network-side device, where the first information indicates that an RLF occurs to one or more second devices; and the first device and the one or more second devices jointly transmit a first service.

In a fifth aspect, an apparatus for processing an RLF is provided, including: a second sending module, configured to send second information to a first device, where the second information indicates that the first device should report occurrence of an RLF to one or more second devices to a network-side device; and the first device and the one or more second devices jointly transmit a first service.

In a sixth aspect, an apparatus for processing an RLF is provided, including: a second sending module, configured to receive first information from a first device, where the first information indicates that an RLF occurs to one or more second devices; and the first device and the one or more second devices jointly transmit a first service.

In a seventh aspect, a terminal is provided, including a processor, a memory, and a program stored in the memory and executable in the processor. The program, when executed by the processor, implements the steps of the method in the first aspect or the second aspect.

In an eighth aspect, a terminal is provided, including a processor and a communication interface. The processor is configured to implement the steps of the method in the first aspect or the second aspect when executing a program.

In a ninth aspect, a network-side device is provided, including a processor, a memory, and a program stored in the memory and executable in the processor. The program, when executed by the processor, implements the steps of the method in the third aspect.

In a tenth aspect, a network-side device is provided, including a processor and a communication interface. The processor is configured to implement the steps of the method in the third aspect when executing a program.

In an eleventh aspect, a readable storage medium is provided, storing a program or instructions. The program or the instructions, when executed by a processor, implement the steps of the method in the first aspect, the second aspect, or the third aspect.

In a twelfth aspect, a computer program/program product is provided, which is stored in a non-volatile storage medium. The computer program/program product, when executed by at least one processor, implements the steps of the processing method in the first aspect, the second aspect, or the third aspect.

In a thirteenth aspect, a chip is provided, including a processor and a communication interface. The communication interface is coupled to the processor. The processor is configured to execute a program or instructions to implement the processing method in the first aspect, the second aspect, or the third aspect.

BRIEF DESCRIPTION OF THE DRAWINGS

FIG. 4 is a flowchart III of a method for processing a radio link failure according to an embodiment of this application;

DETAILED DESCRIPTION

The technical solutions in embodiments of this application are clearly described below with reference to the drawings in the embodiments of this application. Apparently, the described embodiments are merely some of the embodiments of this application rather than all of the embodiments. All other embodiments obtained by a person of ordinary skill in the art based on the embodiments of this application fall within the protection scope of this application.

The terms "first", "second", and the like in the description and the claims of this application are used for distinguishing between similar objects, rather than describing a specified sequence or order. It should be understood that the terms used in this case may be transposed where appropriate, so that the embodiments of this application may be implemented in a sequence other than those illustrated or described herein. In addition, objects distinguished by "first" and "second" are generally of the same class and do not limit a quantity of objects. For example, one or more first objects may be arranged. In addition, "and" in the description and the claims indicates at least one of the connected objects, and the character "I" generally indicates that the associated objects at front and rear are in an "or" relationship.

It should be noted that, the technology described in the embodiments of this application may be applied to a long term evolution (LTE)/LTE-advanced (LTE-A) system, and may be further applied to another wireless communication system, such as a code division multiple access (CDMA) system, a time division multiple access (TDMA) system, a frequency division multiple access (FDMA) system, an orthogonal frequency division multiple access (OFDMA) system, a single-carrier frequency-division multiple access (SC-FDMA) system, and another system. The terms "system" and "network" in the embodiments of this application are usually interchangeably used, and the technology described may be used for both the systems and radio technologies mentioned above, as well as for another system and radio technology. A new radio (NR) system is described below for an illustrative purpose, and the term NR is used in most of the following descriptions, although these technologies may be applied to applications other than applications of the NR system, such as a 6th Generation (6G) communication system.

Figures 1, 2, 3:
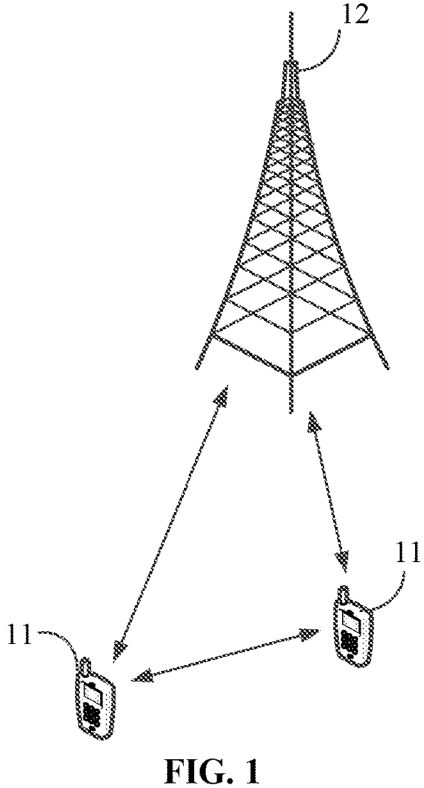
FIG. 1 is a schematic diagram of a wireless communication system to which embodiments of this application may be applied.
FIG. 2 is a flowchart I of a method for processing a radio link failure according to an embodiment of this application.
FIG. 3 is a flowchart II of a method for processing a radio link failure according to an embodiment of this application.

FIG. 1 is a block diagram of a wireless communication system to which embodiments of this application may be applied. The wireless communication system includes a terminal 11 and a network-side device 12. The terminal 11 may alternatively be referred to as a terminal device or a user terminal (UE). The terminal 11 may be a terminal-side device such as a mobile phone, a tablet personal computer, a laptop computer, which is alternatively referred to as a notebook computer, a personal digital assistant (PDA), a handheld computer, a netbook, an ultra-mobile personal computer (UMPC), a mobile Internet device (MID), a wearable device or a vehicle-mounted device (VUE), or a pedestrian terminal (PUE). The wearable device includes a smartwatch, a bracelet, a headset, glasses, and the like. It should be noted that, a specific type of the terminal 11 and a quantity of terminals 11 are not defined in the embodiments of this application. For example, 2, 3, 4 or more than 4 terminals may be arranged.

The network-side device 12 may be a base station or a core network. The base station may be referred to as a node B, an evolved node B, an access point, a base transceiver station (BTS), a radio base station, a radio transceiver, a basic service set (BSS), an extended service set (ESS), a NodeB, an evolving NodeB (eNB), a household NodeB, a household evolved NodeB, a wireless local area network (WLAN) access point, a wireless fidelity (Wi-Fi) node, a transmitting receiving point (TRP), a radio access network node, or another appropriate term in the art. The base station is not limited to the specified technical terms, as long as the same technical effects can be achieved. It should be noted that, in this embodiment of this application, only a base station in the NR system is used as an example, but the specific type of the base station is not limited.

Referring to FIG. 2, an embodiment of this application provides a method for processing an RLF. Specific steps include step 201.

Step 201: A first device sends first information to a network-side device, where the first information indicates that an RLF occurs to one or more second devices.

The first device and the one or more second devices jointly transmit a first service, for example, a streaming media service, but the first service is not limited thereto.

In an embodiment of this application, the method further includes:

receiving, by the first device, second information from the one or more second devices, where the second information indicates that the first device should report the occurrence of the RLF to the one or more second devices to the network-side device.

It should be noted that, the first device may also be referred to as a master device (for example, a master UE), and the second device may also be referred to as a secondary device (for example, a secondary UE). Alternatively, the first device may also be referred to as the secondary device, and the second device may also be referred to as the master device.

It may be understood that the second information may implicitly or explicitly indicate that the first device should report the occurrence of the RLF to the one or more second devices to the network-side device. For example, the second information does not have a field that explicitly indicates that the first device should report the occurrence of the RLF to the one or more second devices to the network-side device. Instead, after the first device receives the second information, the first device actively reports the occurrence of the RLF to the one or more second devices to the network-side device. For another example, the second information includes a specific field, and the specific field indicates that the occurrence of the RLF to the one or more second devices needs to be reported to the network-side device. If the first device detects the specific field in the second information, the first device reports the occurrence of the RLF to the one or more second devices to the network-side device. In this way, power consumption of the second device can be reduced.

For example, a mobile phone (equivalent to the first device) and a smartwatch (equivalent to the second device) jointly transmit streaming media. When an RLF occurs to the smartwatch, the smartwatch may send second information to the mobile phone, to reduce power consumption of the smartwatch. That is to say, the mobile phone is expected to report the RLF of the smartwatch to the network-side device.

In an embodiment of this application, that the RLF occurs to the one or more second devices includes one of:

(1) the RLF occurs in a radio link between the one or more second devices and the network-side device;

(2) the RLF occurs in the radio link between the one or more second devices and the network-side device, radio resource control reestablishment initiated by the one or more second devices fails, and RRC reconnection initiated by the one or more second devices fails; and (3) the RLF occurs in a radio link between the one or more second devices and the first device.

In an embodiment of this application, the second information includes one or more of:

(1) information indicating that the RLF occurs to the one or more second devices;

(2) information indicating that an RRC reestablishment failure occurs to the one or more second devices; and (3) information indicating that an RRC reconnection failure occurs to the one or more second devices.

In an embodiment of this application, the first information includes one or more of:

(1) information indicating that the RLF occurs to the one or more second devices;

(2) information indicating that an RRC reestablishment failure occurs to the one or more second devices;

(3) information indicating that an RRC reconnection failure occurs to the one or more second devices; and (4) relevant information of the second devices.

The relevant information of the second devices may include one or more of:

(1) identification information of the second device, for example, a serving-temporary mobile subscriber identity (S-TMSI) of the second device;

(2) authorization or authentication information of the second device, which is used for verifying a multi-UE architecture license on a core network side and a radio access network (RAN) side;

(3) capability information of the second device, which is used for providing a suitable configuration for the first device; and (4) another piece of secondary information of the second device, for example, a power saving requirement and a transmission requirement.

In this embodiment of this application, when two or more devices jointly transmit a service, the devices may report the RLF to the network-side device collaboratively, which ensures reliability of data transmission and user experience.

Referring to FIG. 3, an embodiment of this application provides a method for processing an RLF. Specific steps include step 301.

Step 301: A second device sends second information to a first device, where the second information indicates that the first device should report occurrence of an RLF to one or more second devices to a network-side device.

The first device and the one or more second devices jointly transmit a first service.

In an embodiment of this application, the method further includes:

receiving, by the second device, third information from the network-side device; and initiating, by the second device, an RRC reestablishment process or an RRC reconnection process to the network-side device based on the third information.

In an embodiment of this application, that the RLF occurs to the one or more second devices includes one of:

(1) the RLF occurs in a radio link between the one or more second devices and the network-side device;

(2) the RLF occurs in the radio link between the one or more second devices and the network-side device, RRC reestablishment initiated by the one or more second devices fails, and RRC reconnection initiated by the one or more second devices fails; and (3) the RLF occurs in a radio link between the one or more second devices and the first device.

In an embodiment of this application, the second information includes one or more of:

(1) information indicating that the RLF occurs to the one or more second devices;

(2) information indicating that an RRC reestablishment failure occurs to the one or more second devices; and (3) information indicating that an RRC reconnection failure occurs to the one or more second devices.

In this embodiment of this application, when two or more devices jointly transmit a service, information about the RLF is exchanged between the devices, so that the devices may report the RLF to the network-side device collaboratively, which reduces energy consumption of the second device, and ensures reliability of data transmission and user experience.

Referring to FIG. 4, an embodiment of this application provides a method for processing an RLF. Specific steps include step 401.

Step 401: A network-side device receives first information from a first device, where the first information indicates that an RLF occurs to one or more second devices.

The first device and the one or more second devices jointly transmit a first service.

In an embodiment of this application, that the RLF occurs to the one or more second devices includes one of:

(1) the RLF occurs in a radio link between the one or more second devices and the network-side device;

(2) the RLF occurs in the radio link between the one or more second devices and the network-side device, RRC reestablishment initiated by the one or more second devices fails, and RRC reconnection initiated by the one or more second devices fails; and (3) the RLF occurs in a radio link between the one or more second devices and the first device.

In an embodiment of this application, the method further includes:

determining, by the network-side device based on the first information, to perform one or more of the following operations:

(1) reconfiguring the second device;

(2) releasing a connection between the second device and the network-side device; and (3) reconfiguring the first device as a secondary UE and the second device as a master UE in a case that the first device is the master UE and the second device is the secondary UE, or reconfiguring the first device as the master UE and the second device as the secondary UE in a case that the first device is the secondary UE and the second device is the master UE.

In an embodiment of this application, the method further includes:

sending, by the network-side device, third information (or referred to as reestablishment information) to the second device in a case that the network-side device determines, based on the first information, that the second device needs to be reconfigured.

The third information indicates that the second device should initiate an RRC reestablishment process or an RRC reconnection process to the network-side device.

In an embodiment of this application, the method further includes:

determining, by the network-side device based on the first information, to stop data transmission with the one or more second devices.

In an embodiment of this application, the first information includes one or more of:

(1) information indicating that the RLF occurs to the one or more second devices;

(2) information indicating that an RRC reestablishment failure occurs to the one or more second devices;

(3) information indicating that an RRC reconnection failure occurs to the one or more second devices; and (4) relevant information of the second devices.

The relevant information of the second devices includes one or more of:

(1) identification information of the second device;

(2) authorization or authentication information of the second device;

(3) capability information of the second device; and (4) another piece of secondary information of the second device.

In this embodiment of this application, when two or more devices jointly transmit a service, information about the RLF is exchanged between the devices, so that the devices may report the RLF to the network-side device collaboratively, which reduces energy consumption of the second device, and ensures reliability of data transmission and user experience.

The embodiments of the application are described with reference to a scenario 1 and a scenario 2. It should be noted that two UEs are exemplified in the scenario 1 and the scenario 2. A quantity of UEs that jointly transmit the first service is not limited in the embodiments of the application. That is to say, two UEs, three UEs, four UEs, or more than four UEs may be used.

Two UEs are used as an example. The two UEs include a UE 1 and a UE 2. The UE 1 may be referred to as a master UE, and the UE 2 may be referred to as a secondary UE.

Embodiment I: Each UE maintains a radio link status of the UE

Figure 5:
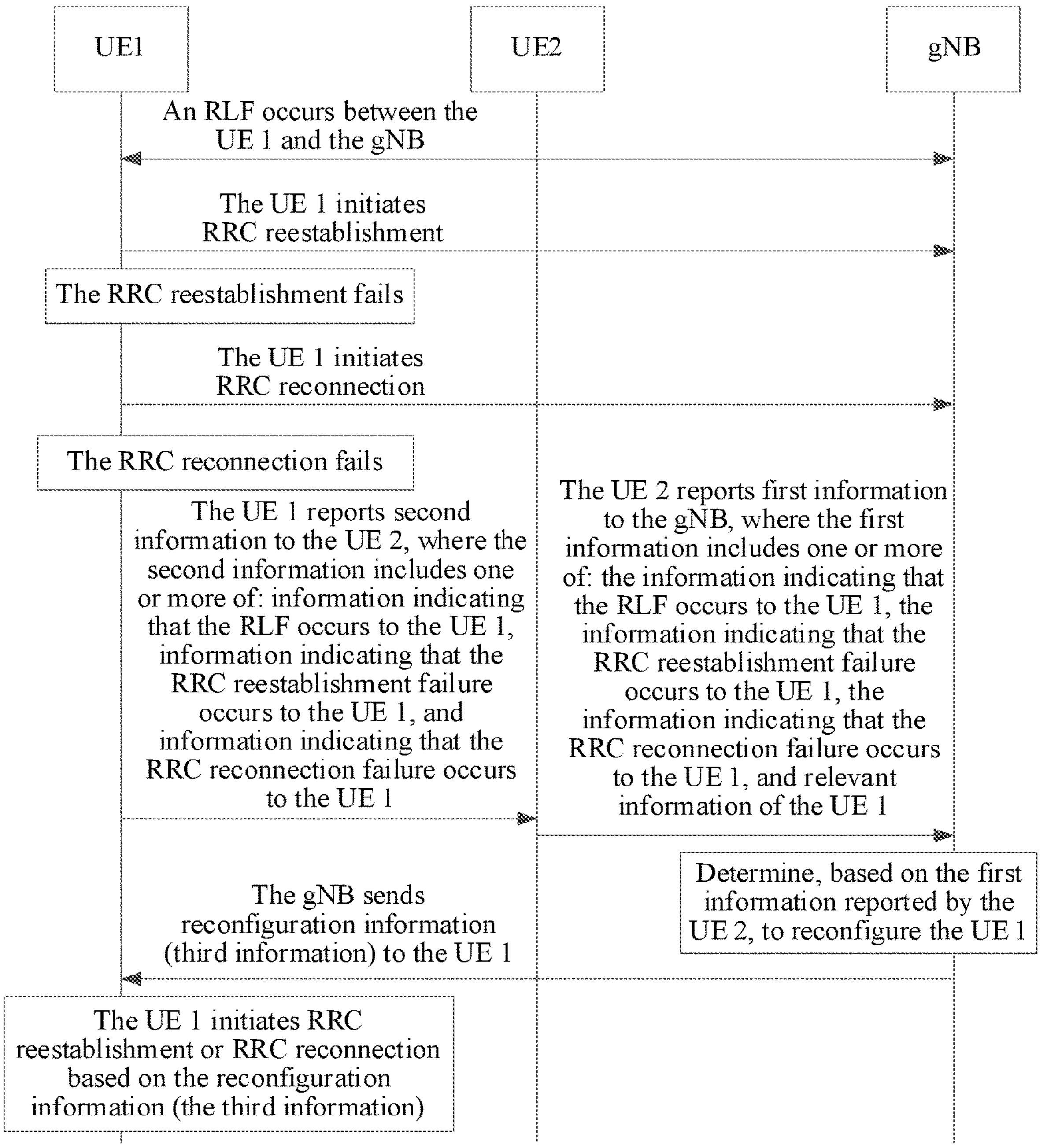
FIG. 5 is a flowchart IV of a method for processing a radio link failure according to an embodiment of this application.

Scheme 1:

Referring to FIG. 5, when an RLF occurs between the UE 1 and a base station (gNB), the UE 1 initiates RRC reestablishment.

If an RRC reestablishment failure occurs to the UE 1 (equivalent to a second device), the UE 1 initiates RRC reconnection.

If the RRC connection also fails, the UE 1 may report, to the UE 2 (equivalent to a first device), one or more of:

(1) information indicating that the RLF occurs to the UE 1;

(2) information indicating that the RRC reestablishment failure occurs to the UE 1; and (3) information indicating that the RRC reconnection failure occurs to the UE 1.

If the UE 2 receives one or more (second information) of the information indicating that the RLF occurs to the UE 1, the information indicating that the RRC reestablishment failure occurs to the UE 1, and the information indicating that the RRC reconnection failure occurs to the UE 1 reported by the UE 1, the UE 2 reports, to the gNB, one or more (first information) of the information indicating that the RLF occurs to the UE 1, the information indicating that the RRC reestablishment failure occurs to the UE 1, the information indicating that the RRC reconnection failure occurs to the UE 1, and relevant information of the UE 1.

Optionally, the relevant information of the UE 1 includes one or more of:

(1) identification information of the UE 1, for example, an S-TMSI;

(2) authorization/authentication information of the UE 1, which is used for verifying a multi-UE architecture license on a core network side and a RAN side;

(3) capability information of the UE 1, which is used for providing a suitable configuration for the UE 2; and (4) another piece of secondary information of the UE 1, for example, a power saving requirement and a transmission requirement.

If the gNB receives the information (the first information) reported by the UE 2, the gNB may determine to reconfigure the UE 1. The UE 1 receives reconfiguration information from the gNB, and then the UE 1 initiates RRC reestablishment or RRC reconnection again and connects to the gNB.

Figure 6:
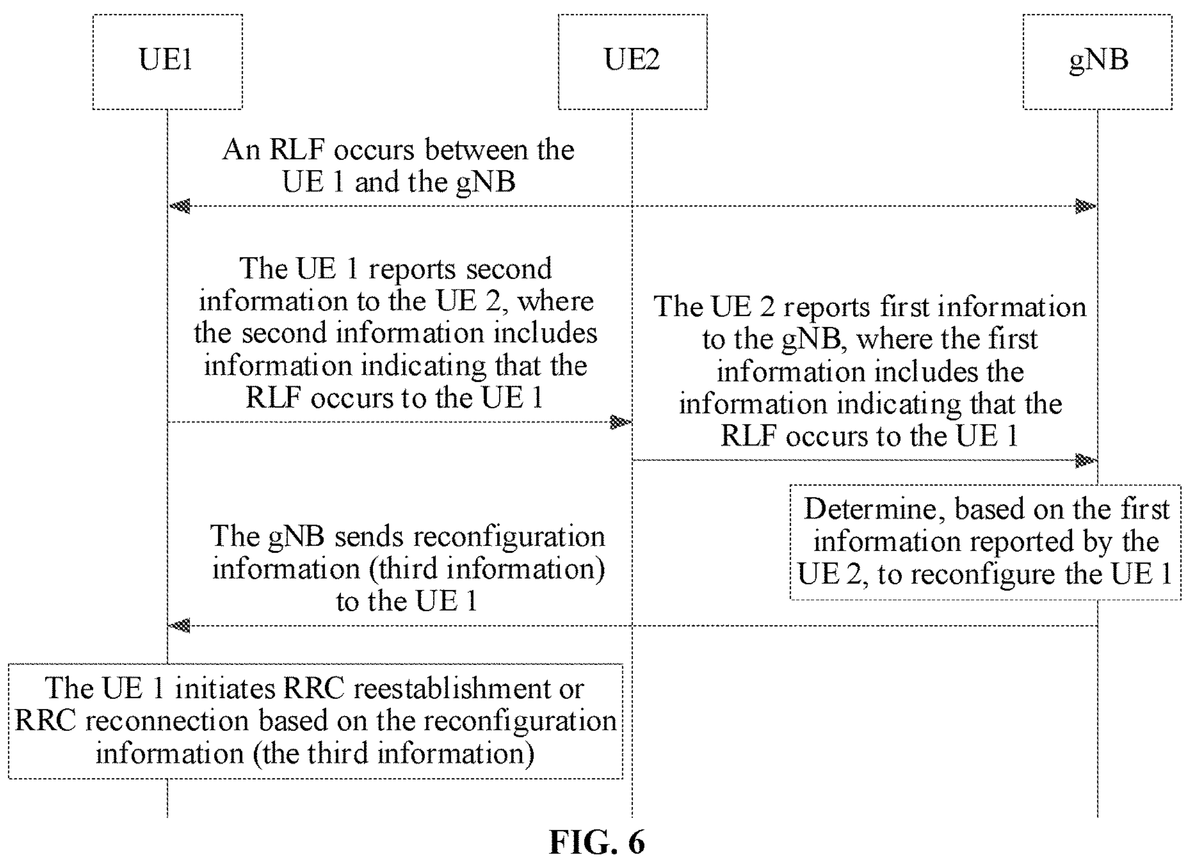
FIG. 6 is a flowchart V of a method for processing a radio link failure according to an embodiment of this application.

Scheme 2:

Referring to FIG. 6, an RLF occurs between the UE 1 (equivalent to a second device) and a gNB.

If the RLF occurs to the UE 1, the UE 1 reports, to the UE 2 (equivalent to a first device), information (first information) indicating that the RLF occurs to the UE 1.

If the UE 2 receives the information indicating that the RLF occurs to the UE 1 reported by the UE 1, the UE 2 reports, to the gNB, one or more of the information indicating that the RLF occurs to the UE 1 and relevant information (second information) of the UE 1.

Optionally, the relevant information of the UE 1 includes one or more of:

(1) identification information of the UE 1, for example, an S-TMSI;

(2) authorization/authentication information of the UE 1, which is used for verifying a multi-UE architecture license on a core network side and a RAN side;

(3) capability information of the UE 1, which is used for providing a suitable configuration for the UE 2; and (4) another piece of secondary information of the UE 1, for example, a power saving requirement and a transmission requirement.

If the gNB receives the information reported by the UE 2, the gNB may determine to reconfigure the UE 1. Based on reconfiguration information received from the gNB, the UE 1 initiates RRC reestablishment or RRC reconnection again and connects to the gNB.

Embodiment II: One UE Maintains Radio Link Statuses of the UE and Another UE

In this architecture, only a UE (a master UE, for example, a UE 1) maintains radio link changes of the UE and all other UEs (a secondary UE, for example, a UE 2), and performs RLF detection.

Figure 7:
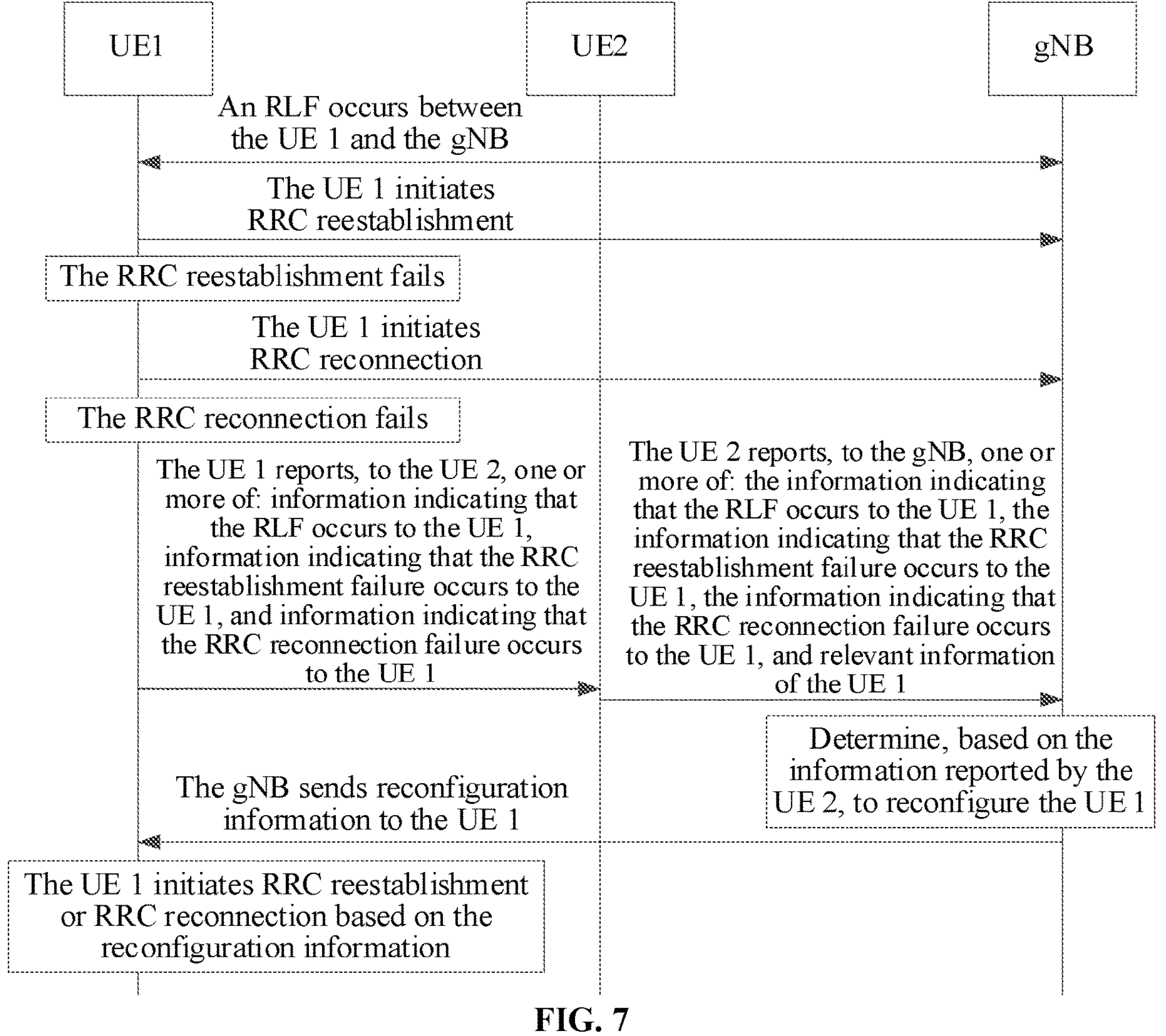
FIG. 7 is a flowchart VI of a method for processing a radio link failure according to an embodiment of this application.

Referring to FIG. 7, when an RLF occurs to the UE 1 (equivalent to a second device), the UE 1 initiates RRC reestablishment.

If an RRC reestablishment failure occurs to the UE 1, the UE 1 initiates RRC reconnection.

If the RRC connection also fails, the UE 1 reports first information to the UE 2 (equivalent to a first device). The first information indicates that the RLF occurs to the UE 1 and an RRC connection failure occurs to the UE 1.

If the UE 2 receives second information reported by the UE 1, the UE 2 initiates RRC connection to a gNB, and reports the first information to the gNB. The first information includes one or more of information indicating that the RLF occurs to the UE 1, information indicating that the RRC reestablishment failure occurs to the UE 1, information indicating that the RRC reconnection failure occurs to the UE 1, and relevant information of the UE 1.

Optionally, the relevant information of the UE 1 includes one or more of:

(1) identification information of the UE 1, for example, an S-TMSI;

(2) authorization/authentication information of the UE 1, which is used for verifying a multi-UE architecture license on a core network side and a RAN side;

(3) capability information of the UE 1, which is used for providing a suitable configuration for the UE 2; and (4) another piece of secondary information of the UE 1, for example, a power saving requirement and a transmission requirement.

If the gNB receives the first information reported by the UE 2, the gNB may determine one or more of the following operations:

(1) Reconfiguration information is sent to the UE 1.

The UE 1 receives the reconfiguration information from a network, and then the UE 1 initiates the RRC reestablishment or the RRC reconnection and connects to the gNB.

(2) The gNB releases the connection between the UE 2 and the gNB after the UE 1 recovers the connection.

(3) The UE 1 is reconfigured and the UE 1 and the UE 2 are switched between the roles of master UE and secondary UE.

In other words, if the UE 1 is the master UE and the UE 2 is the secondary UE, after receiving the second information reported by the UE 2, the gNB may determine the UE 2 as the master UE and the UE 1 as the secondary UE. Alternatively, if the UE 2 is the master UE and the UE 1 is the secondary UE, after receiving the second information reported by the UE 2, the gNB may determine the UE 1 as the master UE and the UE 2 as the secondary UE.

Embodiment III: A Link Interruption Occurs Between UEs

When a transmission channel between the UEs breaks, for example, an RLF (in case of a wireless connection) occurs, two schemes may be used.

(1) Scheme 1: Each UE independently maintains a radio link status between the UE and a network.

(2) Scheme 2: Only one UE maintains a radio link status between the UE and a network.

Figure 8:
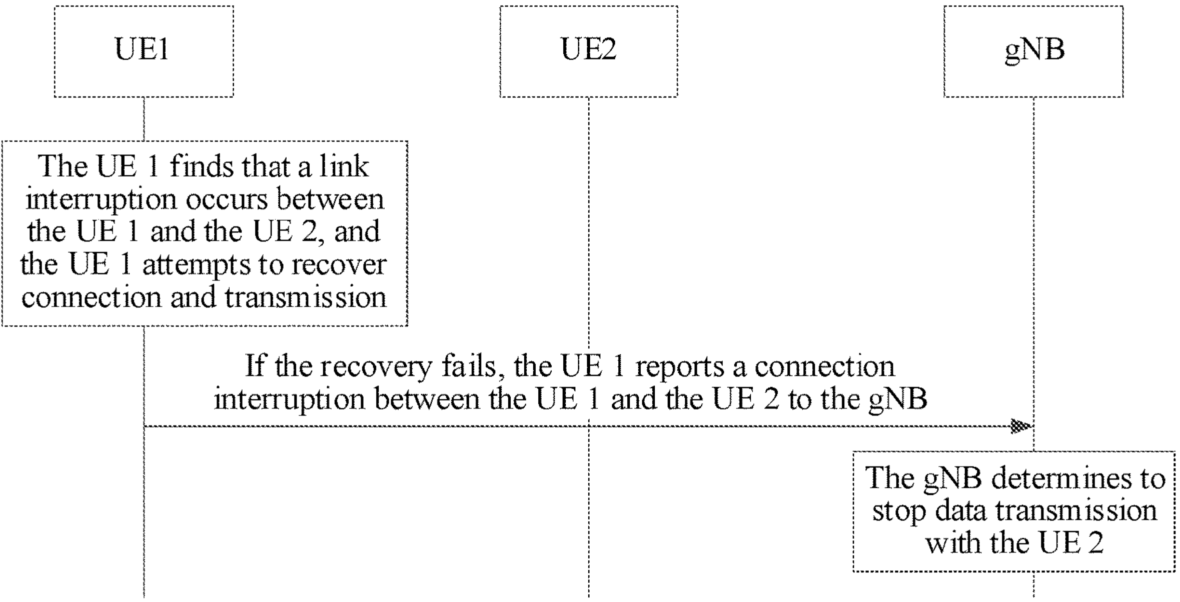
FIG. 8 is a flowchart VII of a method for processing a radio link failure according to an embodiment of this application.

Scheme 1: Each UE independently maintains a radio link status between the UE and a network Referring to FIG. 8, when a UE 1 (a first device) finds that an interruption of a link (for example, an Intx) occurs between the UE 1 and a UE 2 (a second device), the UE 1 attempts to recover connection and transmission of the Intx. If the Intx is not recovered successfully, the UE 1 reports a connection interruption (first information) between the UE 1 and the UE 2 to a gNB.

Optionally, the first information includes relevant information of the UE 2. The relevant information of the UE 2 includes one or more of:

(1) identification information of the UE 2, for example, an S-TMSI;

(2) authorization/authentication information of the UE 2, which is used for verifying a multi-UE architecture license on a core network side and a RAN side;

(3) capability information of the UE 2; and (4) another piece of secondary information of the UE 2, for example, a power saving requirement and a transmission requirement.

When the gNB receives the information reported by the UE 1, the gNB may determine to stop data transmission with the UE 2.

Scheme 2: Only one UE (a master UE, for example, a UE 1) maintains a radio link status between the UE and a network Referring to FIG. 9, when a UE 2 (a first device) finds that an interruption of a link (for example, an interface x (Intx)) between UE 1 and the UE 2, the UE 2 attempts to recover connection and transmission of the Intx. If the Intx is not recovered successfully, the UE 2 may initiate connection to the network, and the UE 2 reports a connection interruption (first information) with the UE 1 to the network.

It may be understood that an interface between the UE 1 and the UE 2 may be an existing interface such as PC5 or F1. The interface may alternatively be a new interface, which is abbreviated as Intx herein.

Optionally, the first information includes relevant information of the UE 1. The relevant information of the UE 1 includes one or more of:

(1) identification information of the UE 1, for example, an S-TMSI;

(2) authorization/authentication information of the UE 1, which is used for verifying a multi-UE architecture license on a core network side and a RAN side;

(3) capability information of the UE 1; and (4) another piece of secondary information of the UE 1, for example, a power saving requirement and a transmission requirement.

When the gNB receives the information reported by the UE 2, the gNB may determine to stop data transmission with the UE 1.

Figures 9, 10:
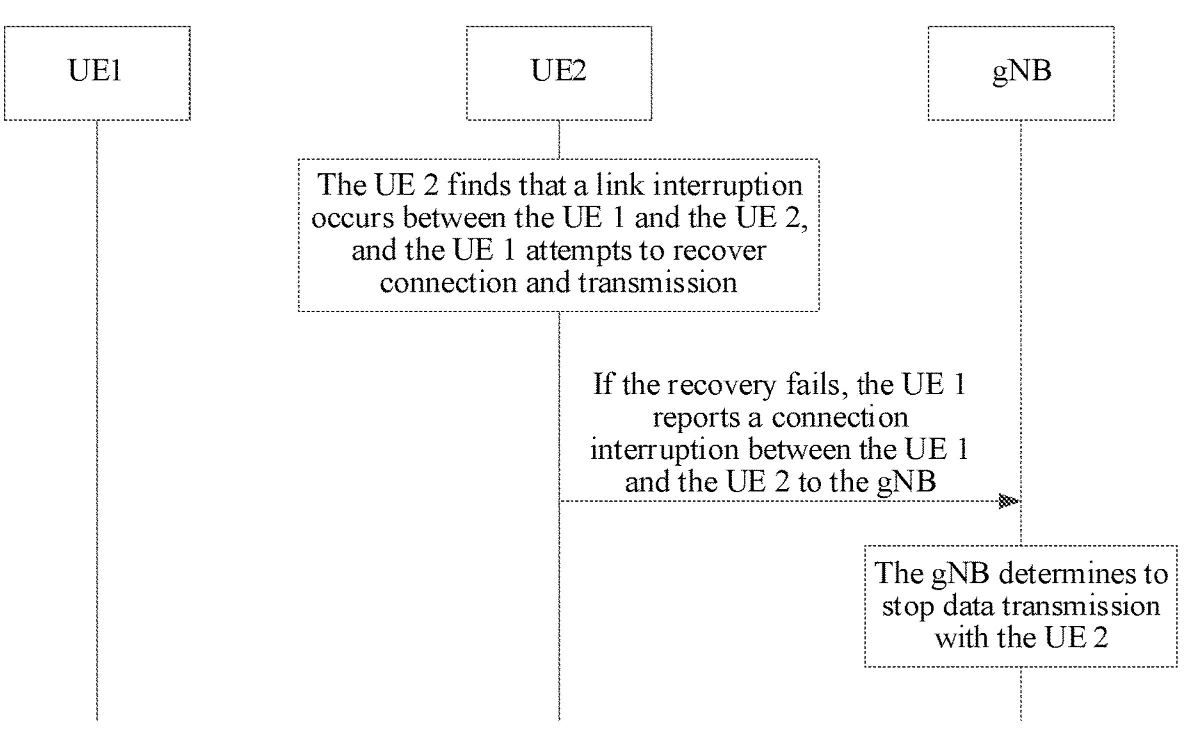
FIG. 9 is a flowchart VIII of a method for processing a radio link failure according to an embodiment of this application.
FIG. 10 is a schematic diagram I of an apparatus for processing a radio link failure according to an embodiment of this application.

Referring to FIG. 10, an embodiment of this application provides an apparatus for processing an RLF. The apparatus 1000 is applied to a first device. The apparatus 1000 includes: a first sending module 1001, configured to send first information to a network-side device, where the first information indicates that a radio link failure RLF occurs to one or more second devices. The first device and the one or more second devices jointly transmit a first service.

In an embodiment of this application, the apparatus 1000 further includes:

a first receiving module, configured to receive second information from the one or more second devices, where the second information indicates that the first device should report the occurrence of the RLF to the one or more second devices to the network-side device.

The first device and the one or more second devices jointly transmit a first service, for example, a streaming media service, but the first service is not limited thereto.

It should be noted that, the first device may also be referred to as a master UE, and the second device may also be referred to as a secondary UE. Alternatively, the first device may also be referred to as the secondary UE, and the second device may also be referred to as the master UE.

In an embodiment of this application, that the RLF occurs to the one or more second devices includes one of:

(1) the RLF occurs in a radio link between the one or more second devices and the network-side device;

(2) the RLF occurs in the radio link between the one or more second devices and the network-side device, RRC reestablishment initiated by the one or more second devices fails, and RRC reconnection initiated by the one or more second devices fails; and (3) the RLF occurs in a radio link between the one or more second devices and the first device.

In an embodiment of this application, the second information includes one or more of:

(1) information indicating that the RLF occurs to the one or more second devices;

(2) information indicating that an RRC reestablishment failure occurs to the one or more second devices; and (3) information indicating that an RRC reconnection failure occurs to the one or more second devices.

In an embodiment of this application, the first information includes one or more of:

(1) information indicating that the RLF occurs to the one or more second devices;

(2) information indicating that an RRC reestablishment failure occurs to the one or more second devices; and (3) information indicating that an RRC reconnection failure occurs to the one or more second devices; and (4) relevant information of the second devices.

The relevant information of the second devices includes one or more of:

(1) identification information of the second device, for example, an S-TMSI of the second device;

(2) authorization or authentication information of the second device;

(3) capability information of the second device; and (4) another piece of secondary information of the second device, for example, a power saving requirement and a transmission requirement.

The apparatus provided in this embodiment of this application can implement all processes implemented in the method embodiment of FIG. 2, and achieve the same technical effects. In order to avoid repetition, details are not described herein.

Figure 11:
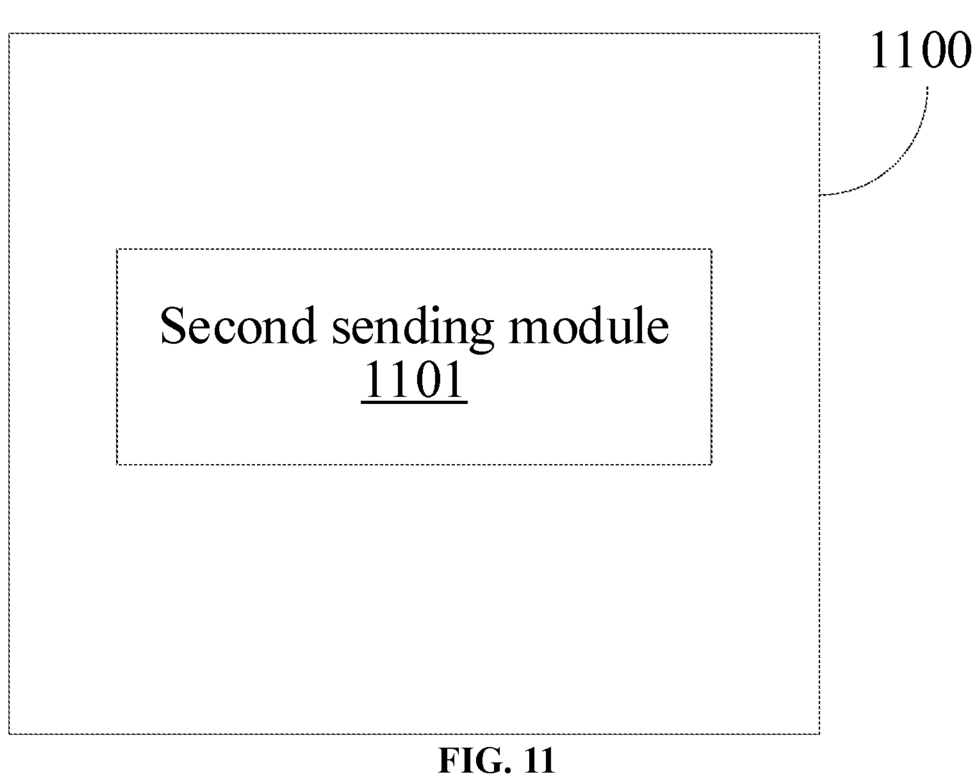
FIG. 11 is a schematic diagram II of an apparatus for processing a radio link failure according to an embodiment of this application.

Referring to FIG. 11, an embodiment of this application provides an apparatus for processing an RLF. The apparatus 1100 is applied to a second device. The apparatus 1100 includes: a second sending module 1101, configured to send second information to a first device, where the second information indicates that the first device should report occurrence of an RLF to one or more second devices to a network-side device.

The first device and the one or more second devices jointly transmit a first service.

In an embodiment of this application, the apparatus 1100 further includes:

a second receiving module, configured to receive third information from the network-side device; and a processing module, configured to initiate an RRC reestablishment process or an RRC reconnection process to the network-side device based on the third information.

In an embodiment of this application, that the RLF occurs to the one or more second devices includes one of:

(1) the RLF occurs in a radio link between the one or more second devices and the network-side device;

(2) the RLF occurs in the radio link between the one or more second devices and the network-side device, RRC reestablishment initiated by the one or more second devices fails, and RRC reconnection initiated by the one or more second devices fails; and (3) the RLF occurs in a radio link between the one or more second devices and the first device.

In an embodiment of this application, the second information includes one or more of:

(1) information indicating that the RLF occurs to the one or more second devices;

(2) information indicating that an RRC reestablishment failure occurs to the one or more second devices; and (3) information indicating that an RRC reconnection failure occurs to the one or more second devices.

The apparatus provided in this embodiment of this application can implement all processes implemented in the method embodiment of FIG. 3, and achieve the same technical effects. In order to avoid repetition, details are not described herein.

Figure 12:
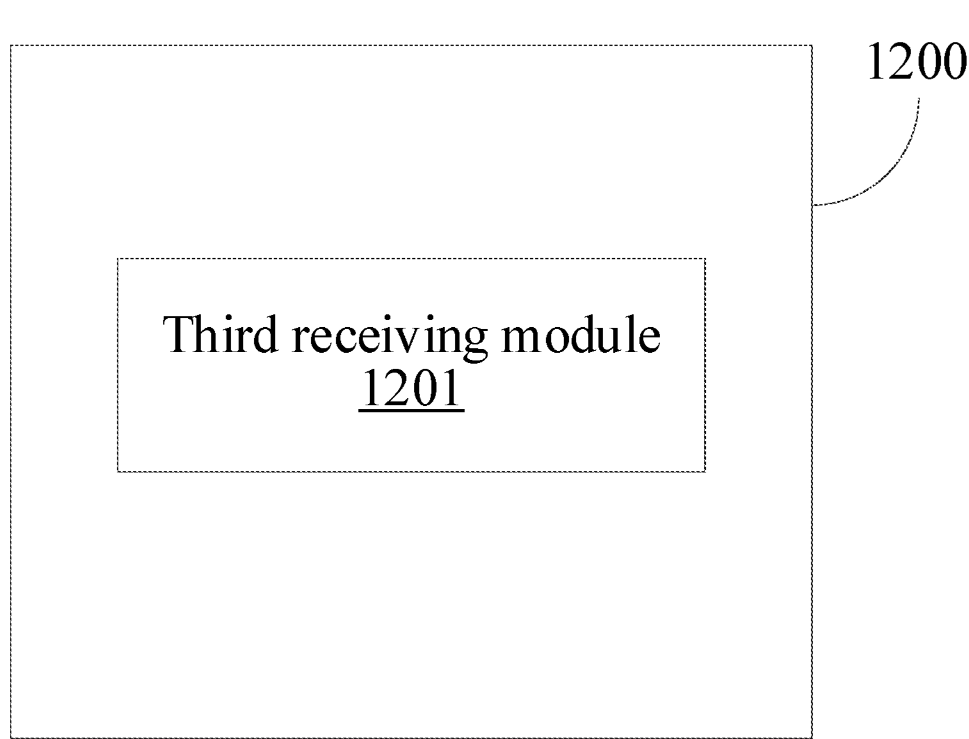
FIG. 12 is a schematic diagram III of an apparatus for processing a radio link failure according to an embodiment of this application.

Referring to FIG. 12, an embodiment of this application provides an apparatus for processing an RLF, which is applied to a network-side device. The apparatus 1200 includes: a third receiving module 1201, configured to receive first information from a first device, where the first information indicates that an RLF occurs to one or more second devices.

The first device and the one or more second devices jointly transmit a first service.

In an embodiment of this application, that the RLF occurs to the one or more second devices includes one of:

(1) the RLF occurs in a radio link between the one or more second devices and the network-side device;

(2) the RLF occurs in the radio link between the one or more second devices and the network-side device, RRC reestablishment initiated by the one or more second devices fails, and RRC reconnection initiated by the one or more second devices fails; and (3) the RLF occurs in a radio link between the one or more second devices and the first device.

In an embodiment of this application, the apparatus 1200 further includes:

an execution module, configured to determine, based on the first information, to perform one or more of the following operations:

(1) reconfiguring the second device;

(2) releasing a connection between the second device and the network-side device; and (3) reconfiguring the first device as a secondary UE and the second device as a master UE in a case that the first device is the master UE and the second device is the secondary UE, or reconfiguring the first device as the master UE and the second device as the secondary UE in a case that the first device is the secondary UE and the second device is the master UE.

In an embodiment of this application, the apparatus 1200 further includes:

a first determination module, configured to send third information to the second device in a case that it is determined based on the first information that the second device needs to be reconfigured.

The third information indicates that the second device should initiate an RRC reestablishment process or an RRC reconnection process to the network-side device.

In an embodiment of this application, the apparatus 1200 further includes:

a second determination module, configured to stop data transmission with the one or more second devices based on the first information.

In an embodiment of this application, the first information includes one or more of:

(1) information indicating that the RLF occurs to the one or more second devices;

(2) information indicating that an RRC reestablishment failure occurs to the one or more second devices; and (3) information indicating that an RRC reconnection failure occurs to the one or more second devices; and (4) relevant information of the second devices.

The relevant information of the second devices includes one or more of:

(1) identification information of the second device;

(2) authorization or authentication information of the second device;

(3) capability information of the second device; and (4) another piece of secondary information of the second device.

The apparatus provided in this embodiment of this application can implement all processes implemented in the method embodiment of FIG. 4, and achieve the same technical effects. In order to avoid repetition, details are not described herein.

An embodiment of this application further provides a terminal, including a processor and a communication interface. The communication interface is configured to receive first information from one or more second devices, where the first information indicates that the first device should report occurrence of an RLF to the one or more second devices to the network-side device. Alternatively, the communication interface is configured to send first information to a first device, where the first information indicates that the first device should report the occurrence of the RLF to the one or more second devices to the network-side device. The terminal embodiment corresponds to the above terminal side method embodiment. The implementation processes and manners of the above method embodiment are applicable to the terminal embodiment, and can achieve the same technical effects.

Figure 13:
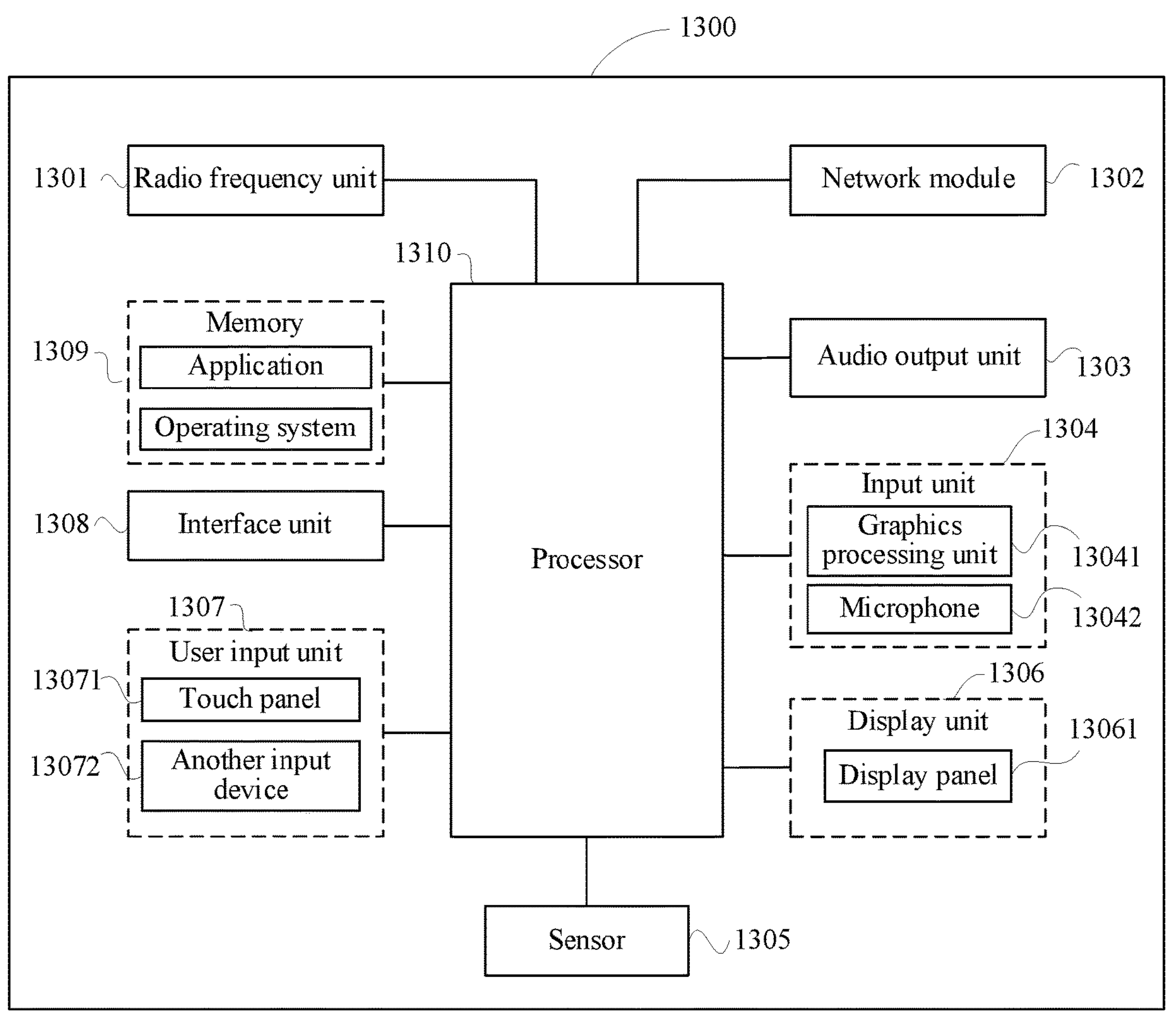
FIG. 13 is a schematic diagram of a terminal according to an embodiment of the present disclosure.

Specifically, FIG. 13 is a schematic diagram of a hardware structure of a terminal for implementing an embodiment of this application. The terminal 1300 includes, but is not limited to, at least some of components such as a radio frequency unit 1301, a network module 1302, an audio output unit 1303, an input unit 1304, a sensor 1305, a display unit 1306, a user input unit 1307, an interface unit 1308, a memory 1309, and a processor 1310.

A person skilled in the art may understand that the terminal 1300 may further include a power supply (such as a battery) that supplies power to various components. The power supply may be logically connected to the processor 1310 through a power management system, thereby implementing functions such as management of charging, discharging, and power consumption through the power management system. The terminal structure shown in FIG. 13 constitutes no limitation on the terminal, and the terminal may include more or fewer components than those shown in the figure, or a combination of some components, or different component arrangements. Details are not described herein.

It should be noted that in this embodiment of this application, the input unit 1304 may include a graphics processing unit (GPU) 13041 and a microphone 13042. The graphics processing unit 13041 processes image data of a static picture or a video obtained by an image capture apparatus (for example, a camera) in a video capture mode or an image capture mode. The display unit 1306 may include a display panel 13061. The display panel 13061 may be configured in a form such as a liquid crystal display or an organic light-emitting diode. The user input unit 1307 includes a touch panel 13071 and another input device 13072. The touch panel 13071 is also referred to as a touch screen. The touch panel 13071 may include two parts: a touch detection apparatus and a touch controller. The another input device 13072 may include but is not limited to a physical keyboard, a function button (such as a volume control button or a power button), a trackball, a mouse, and a joystick. Details are not described herein.

In this embodiment of this application, the radio frequency unit 1301 receives downlink data from a network-side device and provides the data to the processor 1310 for processing. In addition, the radio frequency unit transmits uplink data to the network-side device. Generally, the radio frequency unit 1301 includes but is not limited to an antenna, at least one amplifier, a transceiver, a coupler, a low noise amplifier, and a duplexer.

The memory 1309 may be configured to store software programs or instructions as well as various data. The memory 1309 may mainly include a program or instruction storage area and a data storage area. The program or instruction storage area may store an operating system, an application or an instruction required for at least one function (such as a sound playback function or an image playback function), and the like. In addition, the memory 1309 may include a high-speed random access memory, and may further include a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. For example, the non-volatile memory may include at least one magnetic disk storage device, a flash memory device, or another non-volatile solid-state storage device.

The processor 1310 may include one or more processing units. Optionally, an application processor and a modem processor may be integrated into the processor 1310. The application processor mainly processes an operating system, a user interface, an application, an instruction, and the like. The modem processor mainly processes wireless communication, for example, may be a baseband processor. It may be understood that the modem processor may alternatively not be integrated in the processor 1310.

In an embodiment of this application, the radio frequency unit 1301 is configured to send first information to a network-side device, where the first information indicates that a radio link failure RLF occurs to one or more second devices.

In an embodiment of this application, the radio frequency unit 1301 is further configured to receive second information from the one or more second devices, where the second information indicates that the first device should report the occurrence of the RLF to the one or more second devices to the network-side device.

In another embodiment of this application, the radio frequency unit 1301 is configured to send second information to a first device, where the second information indicates that the first device should report occurrence of an RLF to one or more second devices to a network-side device.

In another embodiment of this application, the radio frequency unit 1301 is further configured to: receive third information from the network-side device; and initiate an RRC reestablishment process or an RRC reconnection process to the network-side device based on the third information.

The terminal provided in this embodiment of this application can implement all processes implemented in the method embodiment of FIG. 2 or FIG. 3, and achieve the same technical effects. In order to avoid repetition, details are not described herein.

An embodiment of this application further provides a network-side device, including a processor and a communication interface. The communication interface is configured to receive second information from a first device, where the second information indicates that an RLF occurs to one or more second devices. The embodiment of the network-side device corresponds to the above method embodiment of the network-side device. The implementation processes and manners of the above method embodiment are applicable to the embodiment of the network-side device, and can achieve the same technical effects.

Figure 14:
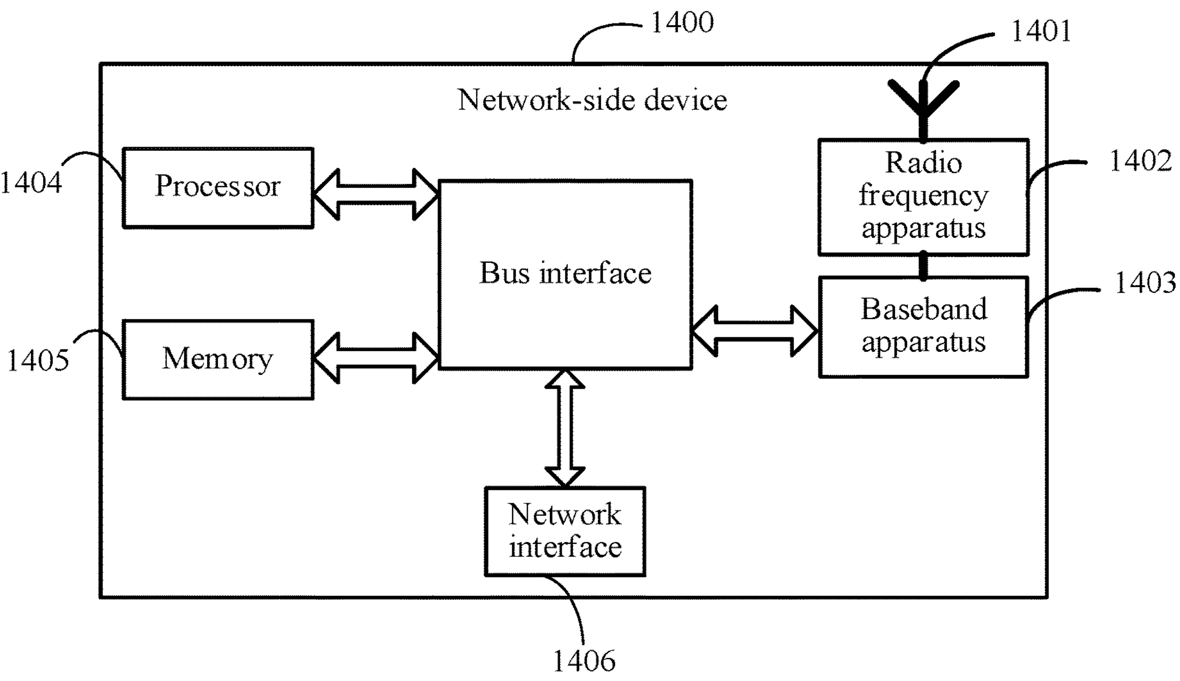
FIG. 14 is a schematic diagram of a network-side device according to an embodiment of this application.

Specifically, an embodiment of this application further provides a network-side device. As shown in FIG. 14, a network-side device 1400 includes an antenna 1401, a radio frequency apparatus 1402, and a baseband apparatus 1403. The antenna 1401 is connected to the radio frequency apparatus 1402. In an uplink direction, the radio frequency apparatus 1402 receives information through the antenna 1401 and sends the received information to the baseband apparatus 1403 for processing. In a downlink direction, the baseband apparatus 1403 processes to-be-sent information and sends the to-be-sent information to the radio frequency apparatus 1402. The radio frequency apparatus 1402 processes the received information and then sends the information through the antenna 1401.

The above frequency band processing apparatus may be located in the baseband apparatus 1403, and the method in the above embodiment performed by the network-side device may be implemented in the baseband apparatus 1403. The baseband apparatus 1403 includes a processor 1404 and a memory 1405.

The baseband apparatus 1403 may include, for example, at least one baseband board. A plurality of chips are arranged on the baseband board, as shown in FIG. 14. One of the chips is, for example, a processor 1404, and is connected to the memory 1405 to call a program in the memory 1405 to perform the operations of the network device shown in the above method embodiment.

The baseband apparatus 1403 may further include a network interface 1406 configured to exchange information with the radio frequency apparatus 1402. The interface is, for example, a common public radio interface (CPRI).

Specifically, the network-side device in this embodiment of this application further includes instructions or a program stored in the memory 1405 and executable in the processor 1404.

In this embodiment of this application, the radio frequency apparatus 1402 is configured to receive first information from a first device, where the first information indicates that an RLF occurs to one or more second devices.

In this embodiment of this application, the processor 1404 is configured to determine, based on the first information, to perform one or more of the following operations:

reconfiguring the second device;

releasing a connection between the second device and the network-side device; and reconfiguring the first device as a secondary device and the second device as a master device in a case that the first device is the master device and the second device is the secondary device, or reconfiguring the first device as the master device and the second device as the secondary device in a case that the first device is the secondary device and the second device is the master device.

In this embodiment of this application, the radio frequency apparatus 1402 is configured to send third information to the second device in a case that the network-side device determines, based on the first information, that the second device needs to be reconfigured.

In this embodiment of this application, the processor 1404 is configured to determine, based on the first information, to stop data transmission with the one or more second devices.

It should be noted that, the processor 1404 calls the instructions or the program in the memory 1405 to perform the method performed by the modules shown in FIG. 12, and achieves the same technical effects. In order to avoid repetition, details are not described herein.

An embodiment of this application further provides a computer program/program product, which is stored in a non-volatile storage medium. The computer program/program product, when executed by at least one processor, implements the steps of the processing method in FIG. 2, FIG. 3, or FIG. 4.

An embodiment of this application further provides a readable storage medium. The readable storage medium stores a program or instructions. The program or instructions, when executed by a processor, implement the processes of the method embodiment shown in FIG. 2, FIG. 3, or FIG. 4, and achieve the same technical effects. In order to avoid repetition, details are not described herein.

The processor is a processor in the terminal described in the above embodiments. The readable storage medium includes a computer-readable storage medium, such as a computer read-only memory (ROM), a random access memory (RAM), a magnetic disk, or an optical disk.

An embodiment of this application further provides a chip. The chip includes a processor and a communication interface. The communication interface is coupled to the processor. The processor is configured to execute a program or instructions to implement the processes of the method embodiment shown in FIG. 2, FIG. 3, or FIG. 4, and achieve the same technical effects. In order to avoid repetition, details are not described herein.

It should be understood that the chip in this embodiment of this application may also be referred to as a system level chip, a system chip, a chip system, a system on chip, or the like.

It should be noted that, a term "comprise", "include", or any other variant herein is intended to encompass non-exclusive inclusion, so that a process, a method, an article or an apparatus including a series of elements not only includes those elements, but also includes another element not listed explicitly or includes intrinsic elements for the process, the method, the article, or the apparatus. Without any further limitation, an element defined by the phrase "include one . . . " does not exclude existence of another same element in the process, the method, the article, or the apparatus that includes the elements. In addition, it should be noted that the scope of the method and the apparatus in the embodiments of this application is not limited to function execution in the order shown or discussed, and may further include function execution in a substantially simultaneous manner or in the opposite order based on the functions. For example, the described method may be performed in different order from the described order, and various steps may also be added, omitted, or combined. In addition, features described with reference to some examples may be combined in another example.

According to the descriptions of the above implementations, a person skilled in the art may clearly learn that the method in the above embodiments may be implemented by software using a necessary universal hardware platform, or may be implemented by hardware. However, in most cases, software using a general hardware platform is an example implementation. Based on such an understanding, the technical solution of this application, in essence, or a part contributing to the related art may be embodied in a form of a computer software product. The software product is stored in a storage medium (such as a ROM/RAM, a disk, or a compact disc), including instructions for causing a terminal (such as a mobile phone, a computer, a server, or a network device) to perform the method in the embodiments of this application.

Although embodiments of this application are described above with reference to the drawings, this application is not limited to the specific embodiments described above. The above specific embodiments are illustrative but not restrictive. With the enlightenment of this application, a person of ordinary skill in the art may make many forms without departing from the concept of this application and the protection scope of the claims. These forms fall within the protection of this application.

What is claimed is:

1. A method for processing a radio link failure (RLF), comprising:

sending, by a first device, first information to a network-side device, wherein the first information indicates that a radio link failure (RLF) occurs to one or more second devices; and the first device and the one or more second devices jointly transmit a first service, wherein that the RLF occurs to the one or more second devices comprises: the RLF occurs in the radio link between the one or more second devices and the network-side device, radio resource control (RRC) reestablishment initiated by the one or more second devices fails, and RRC reconnection initiated by the one or more second devices fails.

2. The method according to claim 1, further comprising:

receiving, by the first device, second information from the one or more second devices, wherein the second information indicates that the first device should report the occurrence of the RLF to the one or more second devices to the network-side device.

3. The method according to claim 1, wherein the first information or the second information comprise one or more of:

information indicating that the RLF occurs to the one or more second devices;

information indicating that an RRC reestablishment failure occurs to the one or more second devices;

information indicating that an RRC reconnection failure occurs to the one or more second devices; and relevant information of the second devices.

4. A method for processing a radio link failure, comprising:

sending, by a second device, second information to a first device, wherein the second information indicates that the first device should report occurrence of an RLF to one or more second devices to a network-side device; and the first device and the one or more second devices jointly transmit a first service, wherein that the RLF occurs to the one or more second devices comprises: the RLF occurs in the radio link between the one or more second devices and the network-side device, RRC reestablishment initiated by the one or more second devices fails, and RRC reconnection initiated by the one or more second devices fails.

5. The method according to claim 4, further comprising:

receiving, by the second device, third information from the network-side device; and initiating, by the second device, an RRC reestablishment process or an RRC reconnection process to the network-side device based on the third information.

6. The method according to claim 4, wherein the second information comprises one or more of:

information indicating that the RLF occurs to the one or more second devices;

information indicating that an RRC reestablishment failure occurs to the one or more second devices; and information indicating that an RRC reconnection failure occurs to the one or more second devices.

7. A method for processing a radio link failure, comprising:

receiving, by a network-side device, first information from a first device, wherein the first information indicates that an RLF occurs to one or more second devices; and the first device and the one or more second devices jointly transmit a first service, wherein that the RLF occurs to the one or more second devices comprises: the RLF occurs in the radio link between the one or more second devices and the network-side device, RRC reestablishment initiated by the one or more second devices fails, and RRC reconnection initiated by the one or more second devices fails.

8. The method according to claim 7, further comprising:

determining, by the network-side device based on the first information, to perform one or more of the following operations:

reconfiguring the second device;

releasing a connection between the second device and the network-side device; and reconfiguring the first device as a secondary device and the second device as a master device in a case that the first device is the master device and the second device is the secondary device, or reconfiguring the first device as the master device and the second device as the secondary device in a case that the first device is the secondary device and the second device is the master device.

9. The method according to claim 8, further comprising:

sending, by the network-side device, third information to the second device in a case that the network-side device determines, based on the first information, that the second device needs to be reconfigured, wherein the third information indicates that the second device should initiate an RRC reestablishment process or an RRC reconnection process to the network-side device.

10. The method according to claim 7, further comprising:

determining, by the network-side device based on the first information, to stop data transmission with the one or more second devices.

11. The method according to claim 7, wherein the first information comprises one or more of:

information indicating that the RLF occurs to the one or more second devices;

information indicating that an RRC reestablishment failure occurs to the one or more second devices;

information indicating that an RRC reconnection failure occurs to the one or more second devices; and relevant information of the second devices.

12. A terminal, comprising:

a processor, a memory, and a program stored in the memory and executable in the processor, wherein the program, when executed by the processor, implements the steps of the method according to claim 1.

13. A terminal, comprising:

a processor, a memory, and a program stored in the memory and executable in the processor, wherein the program, when executed by the processor, implements the steps of the method according to claim 4.

14. A network-side device, comprising:

a processor, a memory, and a program stored in the memory and executable in the processor, wherein the program, when executed by the processor, implements the steps of the method according to claim 7.

15. A non-transitory readable storage medium, storing a program or instructions, wherein the program or the instructions, when executed by a processor, implement the steps of the method according to claim 1.

16. A non-transitory readable storage medium, storing a program or instructions, wherein the program or the instructions, when executed by a processor, implement the steps of the method according to claim 4.

17. A non-transitory readable storage medium, storing a program or instructions, wherein the program or the instructions, when executed by a processor, implement the steps of the method according to claim 7.

* * * * *